(12) United States Patent
Pacione et al.

(10) Patent No.: US 7,980,040 B2
(45) Date of Patent: Jul. 19, 2011

(54) ANCHOR SHEET POSITIONING AND CONNECTION SYSTEM

(75) Inventors: Joseph Rocco Pacione, Newmarket (CA); John Anthony Pacione, Newmarket (CA); Franz Rittmannsberger, Richmond Hill (CA); Hubert Schreimeier, Fohnsdorf Sillweg (AT)

(73) Assignee: Tac-Fast Georgia L.L.C., Atlanta, GA (US)

( * ) Notice: Subject to any disclaimer, the term of this patent is extended or adjusted under 35 U.S.C. 154(b) by 1146 days.

(21) Appl. No.: 10/543,901

(22) PCT Filed: Jan. 29, 2004

(86) PCT No.: PCT/CA2004/000116
§ 371 (c)(1),
(2), (4) Date: Mar. 10, 2006

(87) PCT Pub. No.: WO2004/066794
PCT Pub. Date: Aug. 12, 2004

(65) Prior Publication Data
US 2006/0185303 A1    Aug. 24, 2006

Related U.S. Application Data

(60) Provisional application No. 60/443,563, filed on Jan. 30, 2003.

(51) Int. Cl.
*E04B 5/02* (2006.01)
*E04B 5/43* (2006.01)

(52) U.S. Cl. ...................................... 52/584.1; 52/591.3

(58) Field of Classification Search .................. 52/584.1, 52/796.1, 698, 582.1, 506.05, 591.1, 591.3; 403/169, 170, 174, 348, 349; 411/522
See application file for complete search history.

(56) References Cited

U.S. PATENT DOCUMENTS

| 644,138 A | 2/1900 | Ketchum |
| 652,716 A | 6/1900 | Furness |
| 748,746 A | 1/1904 | Kelsey |
| 1,614,127 A * | 1/1927 | Heppes ................. 52/311.2 |
| 1,673,630 A | 6/1928 | Madge |
| 1,929,871 A | 10/1933 | Jones |
| 2,012,929 A | 8/1935 | Knowland |
| 2,114,450 A | 4/1938 | Maclean |
| 2,735,523 A | 2/1956 | Leyerle et al. |

(Continued)

FOREIGN PATENT DOCUMENTS

AU    4092672    5/1977
(Continued)

OTHER PUBLICATIONS

InterfaceFLOR, Spring Catalog, 2006, pp. 1-56, Canada.

*Primary Examiner* — Khoi Tran
*Assistant Examiner* — Jason Holloway
(74) *Attorney, Agent, or Firm* — Christopher N. Hunter; Brian W. Gray; Norton Rose OR LLP (57) ABSTRACT

Attachment devices are described for attaching and locating overlapped anchor sheets while allowing for some relative movement as to expansion and contraction. Generally, the devices are a male/female connection on corresponding sheets and expansion openings or apertures surrounding either the male or female part to provide for areas of flexibility to provide for possible movement of either the male or female part.

18 Claims, 8 Drawing Sheets

U.S. PATENT DOCUMENTS

| | | | |
|---|---|---|---|
| 3,002,868 A | 10/1961 | Boivin | |
| 3,031,730 A | 5/1962 | Morin | |
| 3,147,528 A | 9/1964 | Erb | |
| 3,247,638 A | 4/1966 | Gay, Jr. | |
| 3,522,637 A | 8/1970 | Brumlik | |
| 3,574,019 A | 4/1971 | Girard | |
| 3,583,057 A | 6/1971 | Kolozsvary | |
| 3,708,833 A | 1/1973 | Ribich | |
| 3,711,349 A | 1/1973 | Snyder et al. | |
| 3,712,845 A | 1/1973 | Hartung | |
| 3,735,988 A | 5/1973 | Palmer | |
| 3,775,856 A | 12/1973 | Schmidt | |
| 3,817,015 A | 6/1974 | Frangos | |
| 3,866,267 A | 2/1975 | Poletti | |
| 3,912,410 A * | 10/1975 | Pofferi | 403/170 |
| 4,060,024 A * | 11/1977 | Deck | 454/319 |
| 4,078,351 A * | 3/1978 | Simpson | 52/536 |
| 4,405,668 A | 9/1983 | Wald | |
| 4,430,837 A * | 2/1984 | Kirschenbaum | 52/506.05 |
| 4,489,115 A | 12/1984 | Layman et al. | |
| 4,528,783 A | 7/1985 | Muir | |
| 4,557,774 A | 12/1985 | Hoopengardner | |
| 4,577,448 A | 3/1986 | Howorth | |
| 4,578,910 A | 4/1986 | Germeroth et al. | |
| 4,638,618 A | 1/1987 | Iesaka et al. | |
| 4,649,069 A | 3/1987 | Tone | |
| 4,671,976 A | 6/1987 | Vidal | |
| 4,673,603 A | 6/1987 | Roth | |
| 4,697,294 A * | 10/1987 | Schafer | 14/69.5 |
| 4,744,194 A | 5/1988 | Yasuyoshi | |
| 4,755,401 A | 7/1988 | Friedrich | |
| 4,766,022 A | 8/1988 | Tone | |
| 4,769,895 A | 9/1988 | Parkins | |
| 4,770,917 A | 9/1988 | Tochacek | |
| 4,786,119 A * | 11/1988 | Smuda | 312/195 |
| 4,797,170 A | 1/1989 | Hoopengardner | |
| 4,810,546 A | 3/1989 | McLaughlin | |
| 4,822,658 A | 4/1989 | Pacione | |
| 4,824,498 A | 4/1989 | Goodwin et al. | |
| 4,825,477 A | 5/1989 | Aranda | |
| 4,829,627 A | 5/1989 | Altus et al. | |
| 4,898,417 A | 2/1990 | Kudo | |
| 4,898,493 A | 2/1990 | Blankenburg | |
| 4,922,670 A | 5/1990 | Naka et al. | |
| 4,968,548 A | 11/1990 | Gibson et al. | |
| 4,974,384 A | 12/1990 | Pacione | |
| 4,996,804 A | 3/1991 | Naka et al. | |
| 5,042,221 A | 8/1991 | Pacione | |
| 5,045,389 A | 9/1991 | Campagna | |
| 5,060,443 A | 10/1991 | Pacione | |
| 5,116,439 A | 5/1992 | Raus | |
| 5,133,166 A | 7/1992 | Pacione | |
| 5,144,786 A | 9/1992 | Pacione | |
| 5,149,573 A | 9/1992 | Kobe et al. | |
| 5,191,692 A | 3/1993 | Pacione | |
| 5,200,245 A | 4/1993 | Brodrick, Jr. | |
| 5,259,163 A | 11/1993 | Pacione | |
| 5,333,423 A * | 8/1994 | Propst | 52/126.6 |
| 5,382,462 A | 1/1995 | Pacione | |
| 5,386,670 A | 2/1995 | Takeda et al. | |
| 5,398,347 A | 3/1995 | Luedtke et al. | |
| 5,479,755 A | 1/1996 | Pacione | |
| 5,482,755 A | 1/1996 | Manning | |
| 5,529,825 A | 6/1996 | Sutherland | |
| 5,537,793 A | 7/1996 | Murasaki | |
| 5,624,200 A * | 4/1997 | Beaulieu | 403/217 |
| 5,640,821 A * | 6/1997 | Koch | 52/698 |
| 5,654,066 A | 8/1997 | Pacione | |
| 5,672,404 A | 9/1997 | Callahan, Jr. et al. | |
| 5,691,026 A | 11/1997 | Zinke et al. | |
| 5,691,027 A | 11/1997 | Eckhardt et al. | |
| 5,693,171 A | 12/1997 | Foster | |
| 5,723,195 A | 3/1998 | Pacione | |
| 5,738,462 A * | 4/1998 | Petersen et al. | 403/353 |
| 5,753,336 A | 5/1998 | Stull | |
| 5,804,273 A | 9/1998 | Drake, Jr. et al. | |
| 5,832,619 A | 11/1998 | Volkema, Jr. | |
| 5,863,637 A | 1/1999 | Mansson et al. | |
| 5,879,777 A | 3/1999 | Shipley | |
| 5,902,663 A | 5/1999 | Justensen et al. | |
| 5,946,874 A * | 9/1999 | Roberts | 52/464 |
| 5,965,232 A | 10/1999 | Vinod | |
| 5,980,230 A | 11/1999 | Dowd et al. | |
| 6,004,065 A * | 12/1999 | Higdon et al. | 403/384 |
| 6,083,596 A | 7/2000 | Pacione | |
| 6,098,354 A * | 8/2000 | Skandis | 52/177 |
| 6,158,185 A | 12/2000 | Counihun | |
| 6,182,414 B1 | 2/2001 | Huang | |
| 6,199,328 B1 * | 3/2001 | McGrath et al. | 52/127.1 |
| 6,203,881 B1 | 3/2001 | Higgins | |
| 6,217,974 B1 | 4/2001 | Pacione | |
| 6,250,001 B1 | 6/2001 | Gillespie | |
| 6,298,624 B1 | 10/2001 | Pacione | |
| 6,306,477 B1 * | 10/2001 | Pacione | 428/62 |
| 6,395,362 B1 | 5/2002 | Pacione | |
| 6,460,303 B1 | 10/2002 | Pacione | |
| 6,526,704 B1 | 3/2003 | Berard et al. | |
| 6,599,599 B1 | 7/2003 | Buckwater et al. | |
| 6,640,513 B2 * | 11/2003 | Ku | 52/589.1 |
| 6,797,353 B1 | 9/2004 | Pacione | |
| 6,802,167 B2 | 10/2004 | Pacione | |
| 7,096,632 B2 * | 8/2006 | Pacione | 52/506.05 |
| 7,185,465 B2 | 3/2007 | Pacione | |
| 7,185,473 B2 | 3/2007 | Pacione | |
| 7,194,843 B2 | 3/2007 | Pacione | |
| 2001/0017017 A1 | 8/2001 | Pacione | |
| 2002/0124515 A1* | 9/2002 | Pacione | 52/509 |
| 2003/0110728 A1* | 6/2003 | Pacione et al. | 52/506.01 |
| 2003/0136074 A1* | 7/2003 | Ku | 52/591.3 |
| 2005/0183371 A1* | 8/2005 | Pacione | 52/591.5 |
| 2007/0079572 A1 | 4/2007 | Pacione | |
| 2007/0204428 A1 | 9/2007 | Pacione | |
| 2007/0204556 A1 | 9/2007 | Pacione | |
| 2009/0313915 A1* | 12/2009 | Kellner | 52/105 |

FOREIGN PATENT DOCUMENTS

| | | |
|---|---|---|
| BE | 853033 | 7/1977 |
| CA | 2 375 141 A1 | 12/2000 |
| DE | 7029524 | 11/1970 |
| DE | 2012523 | 2/1972 |
| DE | 2201231 | 7/1973 |
| DE | 2245915 | 4/1974 |
| DE | 2803006 | 8/1979 |
| DE | 4228597 | 3/1994 |
| DE | 19532685 | 3/1997 |
| DE | 19724698 | 12/1998 |
| EP | 0161637 | 11/1985 |
| EP | 0455926 | 11/1991 |
| EP | 0860543 | 8/1998 |
| FR | 2328432 | 5/1977 |
| FR | 2362257 | 3/1978 |
| FR | 2582210 | 11/1986 |
| FR | 2747605 | 10/1997 |
| GB | 11747 | 6/1892 |
| GB | 1204886 | 9/1970 |
| GB | 1376262 | 12/1974 |
| GB | 1546901 | 5/1979 |
| JP | 5256725 | 5/1977 |
| JP | 5374719 | 7/1978 |
| JP | 5711279 | 1/1982 |
| JP | 5981479 | 6/1984 |
| JP | 61187582 | 11/1986 |
| JP | 288015 | 3/1990 |
| JP | 232151 | 8/1990 |
| JP | 08-326279 | 12/1996 |
| JP | 09-209555 | 8/1997 |
| JP | 10118988 | 5/1998 |
| JP | 10-219975 | 8/1998 |
| JP | 10216962 | 8/1998 |
| WO | 8601247 | 2/1986 |
| WO | 9503723 | 2/1995 |
| WO | 9519242 | 7/1995 |
| WO | 9803104 | 1/1998 |
| WO | 9830381 | 7/1998 |

| | | | | | | |
|---|---|---|---|---|---|---|
| WO | 99/35943 A2 | 7/1999 | | WO | WO 00/74544 | * 12/2000 |
| WO | 9935943 | 7/1999 | | WO | 0181771 | 11/2001 |
| WO | 9935944 | 7/1999 | | | | |
| WO | 0060974 | 10/2000 | | * cited by examiner | | |

ANCHOR SHEET POSITIONING AND CONNECTION SYSTEM

This application is a national phase entry of PCT/CA2004/000116 filed Jan. 29, 2004 designating the United States, which claims priority from U.S. Patent Application No. 60/443,563 filed Jan. 30, 2003. All of these applications are incorporated herein by reference. International Patent Application No. PCT/CA2004/000116 was published in English under Article 21 of the Patent Cooperation Treaty under WO 2004/066794 on Aug. 12, 2004.

FIELD OF THE INVENTION

Structures are disclosed for creating a sub-floor or other horizontal surface of hooks, the surface being formed from adjacent anchor sheets connected by attachment pieces.

BACKGROUND OF THE INVENTION

Several earlier patents by one of the same inventors disclose an anchor sheet which can be supplied as a small or large module, with or without a pre-attached decorative covering. U.S. Pat. Nos. 6,306,477; 6,298,624 describe anchor sheets. Such anchor sheet is also described in a more detailed way in international patent application number PCT/CA00/00681, that was published under WO 00/74544 on Dec. 14, 2000, and U.S. application Ser. No. 09/008,584 filed Jan. 16, 1998, the specifications of all of which are incorporated by reference. These earlier applications also disclose the anchor sheet as a modular unit, many of which many can form a contiguous mass of anchor sheets to be used as a sub-floor. A decorative covering may be attached to the sub-floor, or the sub-floor may be used as a finished floor when presupplied with a decorative surface. Such a contiguous mass can be formed by attaching the anchor sheets together by some form of overlap or by abutting the anchor sheets to each other and using an overlap of decorative covering or tape. Such mass can be free floating or attached to the floor.

SUMMARY OF THE INVENTION

The current invention relates to improved anchor sheets and attachment pieces which when abutted or overlapped can form a generally-flat planar sub-floor or other surface for detachable attachment of overlying decorative pieces, preferably with a hook and loop system. The attachment pieces (also called attachment devices or corner pieces, because they frequently fit into the corner of another sheet), are really generally smaller anchor sheets provided with one-half of a male or female connection, the other half of the male or female connection being placed upon the "main" anchor sheet. It should be appreciated, however, that the size of the anchor sheet and anchor or attachments pieces is somewhat arbitrary. It is possible to have quite small anchor sheets and very large attachment pieces so that, in effect, there is no distinction between the "attachment pieces" and the anchor sheets. Effectively there are two sets of sheets which are overlapped to form a planar surface. In practice, one of the sheets will have a countersunk area of a thickness matching the thickness of at least a portion of the other sheet, so that when overlapped, a planer, substantially flat surface will be presented. Also, generally in practice, one of the sheets will be of a size to substantially cover the floor, with the other sheet being substantially smaller (generally called the "attachment piece"), for fitting into the countersunk area of the anchor sheet. Both the anchor sheets and the attachment pieces themselves are preferably made of polypropylene, or some other plastic. Such plastic may expand and contract according to temperature and humidity. The anchor sheets (and attachment pieces), are preferably designed to have hooks on their upper surface, which receive a covering of decorative pieces, which have loops complimentary to the hooks. If the decorative pieces are, for example, carpet pieces, then it is also advantageous to additionally allow for expansion and contraction of the carpet pieces, by allowing for relative movement of the anchor sheets. However, the anchor sheets themselves also can expand and contract according to temperature and humidity, and therefore, it is advantageous to allow for some expansion and contraction in any event.

It is also advantageous to have the sheets connected together in a positive way, but so as to prevent anchor pieces and anchor sheets from rising up or riding up in relation to each other, which could create a non-planar surface. Thus, it is helpful for the attachment to have a positive connection in a direction at right angles to the plane of the surface, for example a floor, while allowing for some relative movement in a direction along or with the plane of the floor. It is also advantageous if a connection can provide for positive registration, so that the sheets are oriented and spaced in relation to each other by the attachment piece.

Thus, in one aspect of the invention, there is provided a structure for attachment between attachment pieces and anchor sheets, which allows for relative movement between the attachment piece and each anchor sheet, and therefore relative movement between anchor sheets forming a planar surface. This structure can also create a suitable space in between anchor sheets during installation, by setting a connection point between the anchor sheets and the attachment pieces. In another aspect of the invention, one of either the anchor sheet or attachment piece has a male connection and the other a female connection. One of the sheets has a countersunk area containing the one-half of a male and female connection, and the other sheet or attachment piece has the other half of the male-female connection. In addition, either the female element is provided with means for motion of the aperture into an expansion space, or the male element is provided with means so that it can move into an expansion space in a direction along the plane of the floor.

Thus, in one aspect, the invention comprises a male and female connection for overlapped sheets, comprising the following: (i) a first anchor sheet having a substantially horizontal surface, and having a portion countersunk from the horizontal surface at, at least, one edge; and (ii) a central aperture within the countersunk portion; and (iii) a second anchor sheet having at least an overlap portion of a thickness to fit into the countersunk portion of the first anchor sheet, to present a substantially planar surface, the second sheet having a male member having a shaft sized to fit into the aperture on the first sheet member, and having a second portion larger than the aperture at the end of the shaft to create a cam surface means to prevent removal of the male member from the aperture, in which at least one of the male or female members have expansion openings or areas of flexibility in the first or second sheets surrounding either the male member or female aperture, to provide for movement of either the male or female part, in a path between the expansion areas.

In a second aspect, the invention comprises a first sheet member to connect to an overlapped second sheet member to form a substantially horizontal surface, comprising the following: (i) the first sheet member having a first surface and a countersunk surface below the level of the first surface; (ii) the first sheet member having in the countersunk portion a first aperture; (iii) the sheet, provided on two opposite sides of the first aperture with expansion openings proximate to the first aperture, so as to create areas in the sheet of increased flexibility, from either side of the first aperture and a path substantially in the line drawn between the middle of the second and third apertures.

In another aspect, the invention comprises a male sheet member to connect to an overlapped female sheet member to form a substantially horizontal surface, comprising: (i) a sheet member of a thickness substantially the same as the depth of a countersunk portion on a corresponding female sheet member and having a first upper surface; (ii) a snap-fit means comprising at least two flexible prongs projecting from the opposite bottom surface, and having a normal memory position, of a size slightly larger than the size of an aperture of a corresponding female sheet member, each prong having a cam surface projecting radially outwardly.

In an additional aspect of the invention, the invention comprises: (i) a first sheet member having a first surface and a countersunk surface below the level of the first surface, the first sheet having, in the countersunk portion, a first aperture of a diameter x, and a channel of a smaller diameter, and a second sheet member with at least an overlapping portion of a thickness matching the thickness of the countersink of the first sheet member and, having a male member with a stem and a head. The head fits into the aperture of the first sheet member in a first location and the stem has a thickness corresponding to the channel of the first sheet member, so that the second sheet member can be inserted into the first sheet member through the aperture and the shaft moved into the channel to prevent upward motion of the head and of the first sheet member in relation to the second sheet member, and in which the male sheet member contains areas of expansion and flexibility on opposite sides of the male member, so as to provide for flexible movement of the male sheet member in relation to the second sheet along a path drawn between the areas of flexibility surrounding the male member. The areas of expansion may be apertures surrounding the male or female members.

DETAILED DESCRIPTION

Figure 1:
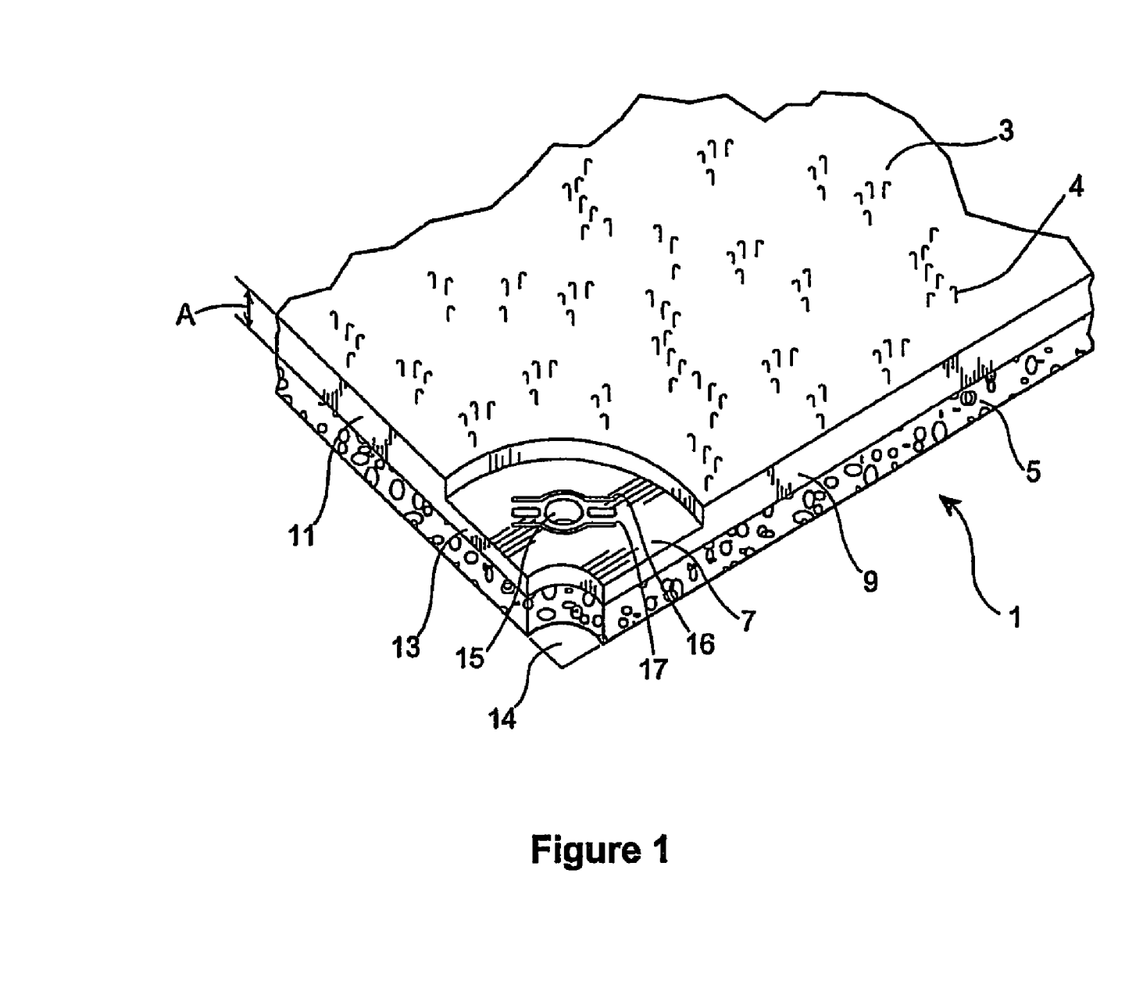
FIG. 1 is a portion of an anchor sheet showing a countersink.

Preferably in the preferred embodiment, as shown in FIG. 1, an anchor sheet 1 has a polyethylene layer 9, in which there is a countersunk area 7 at (in this case), a corner. The sheet is made of polyethylene and is substantially covered with hooks 4 that are injection molded into the sheet. Details of this are described in the corresponding applications entitled "System and Methods of Manufacturing Hook Plates" and "Improved Anchor Sheet" by some of the same inventors filed concurrently herewith, and in earlier cases described earlier in this application, all of which are incorporated herein by reference. The anchor sheet typically has a resilient layer 5, but this is not necessary for the operation of this invention. Contained within the countersunk area, in at least one embodiment, is an aperture 15 and surrounding expansion areas 16 and 17, which will be described more fully in detail later.

Figure 2:
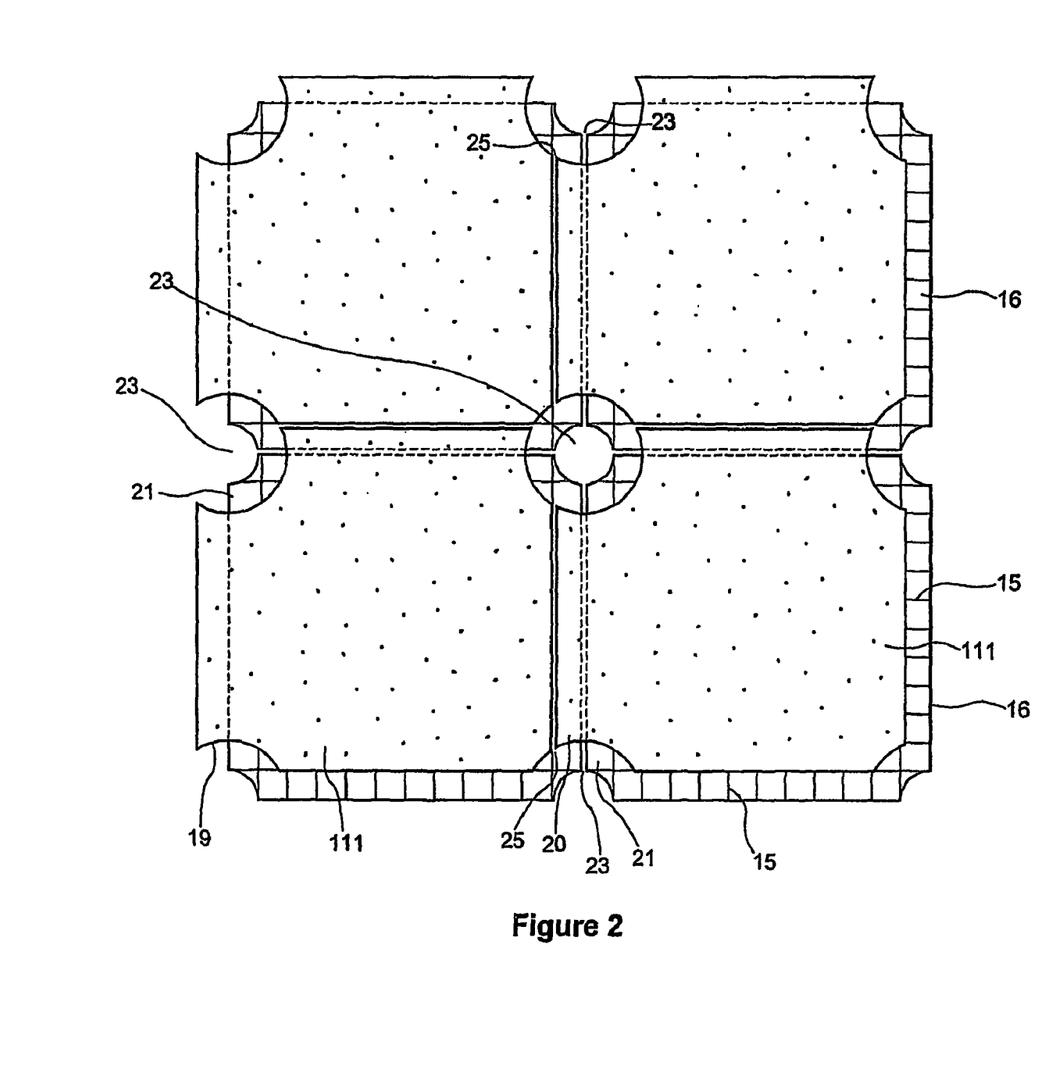
FIG. 2 shows four anchor sheets overlapped on a floor.

Shown in FIG. 2, is a series of anchor sheets, which in this embodiment have an overlapping area 23 and 25, but such overlapping area is also not necessary for this invention. In FIG. 2, the countersunk area for the attachment device is shown at 21.

Figure 3:
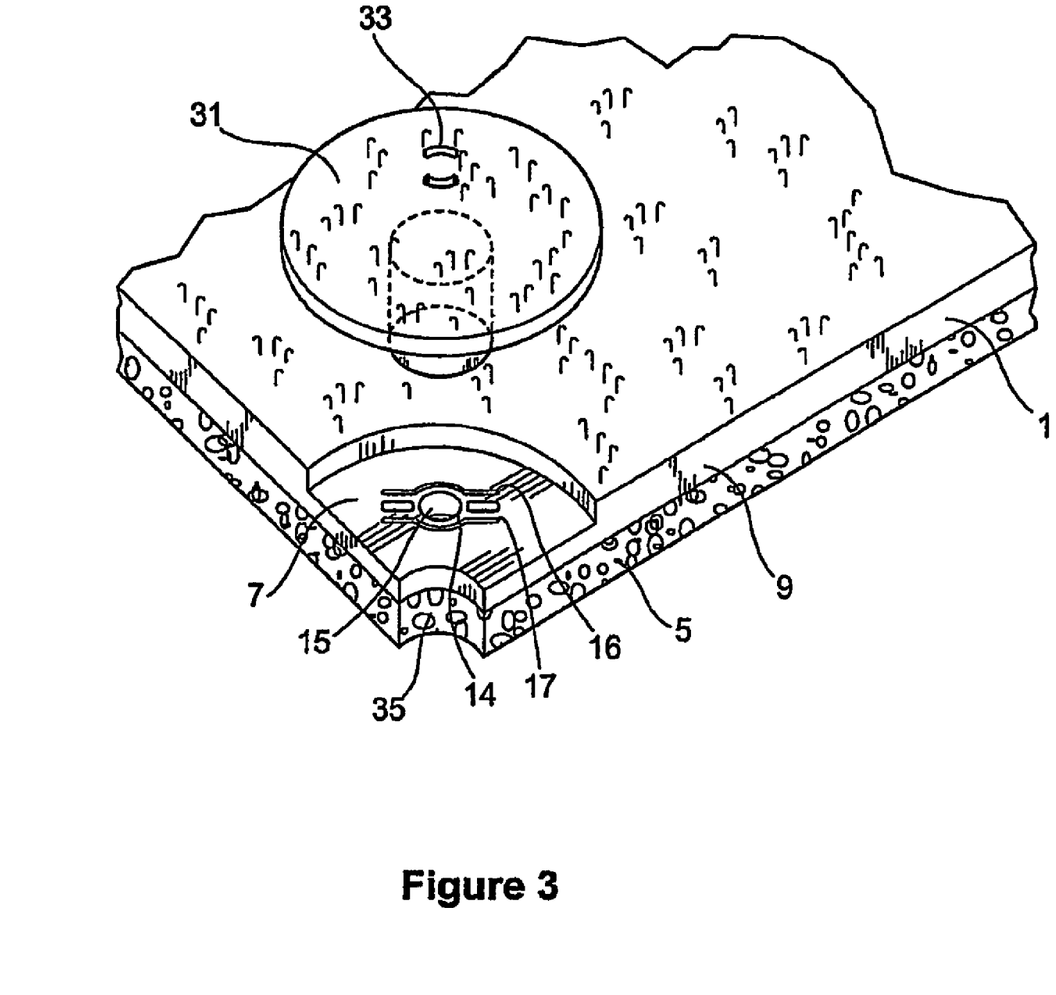
FIG. 3 shows an anchor sheet and attachment device.

FIG. 3, shows an anchor sheet also having a countersunk area 7, an aperture 15 and expansion areas in the sheet 16 and 17. These are areas of reduced strength, so as to allow for movement of the rim 14 around the aperture 15 into the expansion areas as will be described later. FIG. 3 also shows an attachment device 31, which typically will contain a male protrusion 33, projecting onto its under-surface, and which will conform to and fit into aperture 15, as also will be described in further detail later.

Figures 4, 5:
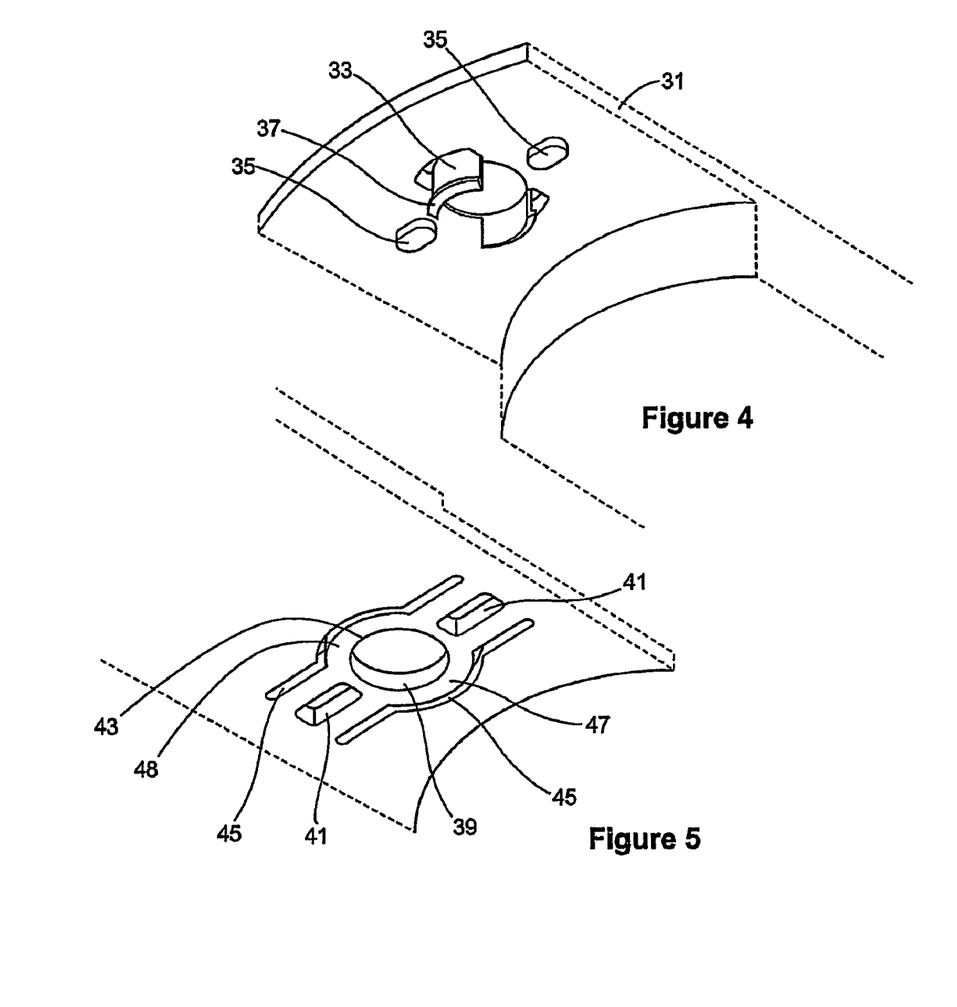
FIG. 4 is a perspective view of an attachment piece from below.
FIG. 5 is a perspective view of an anchor sheet to receive the attachment piece of FIG. 4.

FIG. 4, shows in more detail, a male prong 33 as seen from below attachment device 31. Registration members 35 are also placed underneath attachment piece 31. Male prong 33 is a flexible protrusion, which has a normal memory position as shown in FIG. 4, which is slightly larger than aperture 39. It has a cam surface 37, which contains an edge slightly larger than the corresponding aperture 39 contained in the sheet 1. Shown in FIG. 5, is sheet 1 having aperture 39. There is also a corresponding indentation 41, which matches with the registration member 35 to help centre the snap-fit connection. In practice, male prongs 33 have sufficient flexibility that they can move slightly into aperture 39, but are normally in a position whereby cam surface 37 fits onto the edge 43 of aperture 39 to prevent disengagement of the attachment device 31 from the anchor sheet 1. As will be explained later, there are apertures or expansion openings 45 through the polyethylene sheet 1, and surrounding the aperture 39 on opposite sides, so as to create effectively a structure whereby the aperture 39 is surrounded by a thin surrounding layer of plastic 47 as a rim on two sides of the aperture, thus to allow the aperture to move in a path between the two expansion openings 45. The movement of the aperture allows for some movement of the whole connection between the attachment device 31 and anchor sheet 1 as will be described later. Some movement is also available because of movement of the prongs 33. By appropriate placement of the aperture 39 and prongs 33 in of the overlap area of an attachment piece 31 and the overlap of an anchor sheet 1, an appropriate space can be created between the attachment piece and the anchor sheet. During atmospheric expansion and contraction, the flexibility of prong 33 and the flexibility of rim 47 and 48 around surrounding opening 39, allow rim 47 and 48 to move into the expansion openings 45 as necessary to accommodate expansion and contraction.

Figure 6:
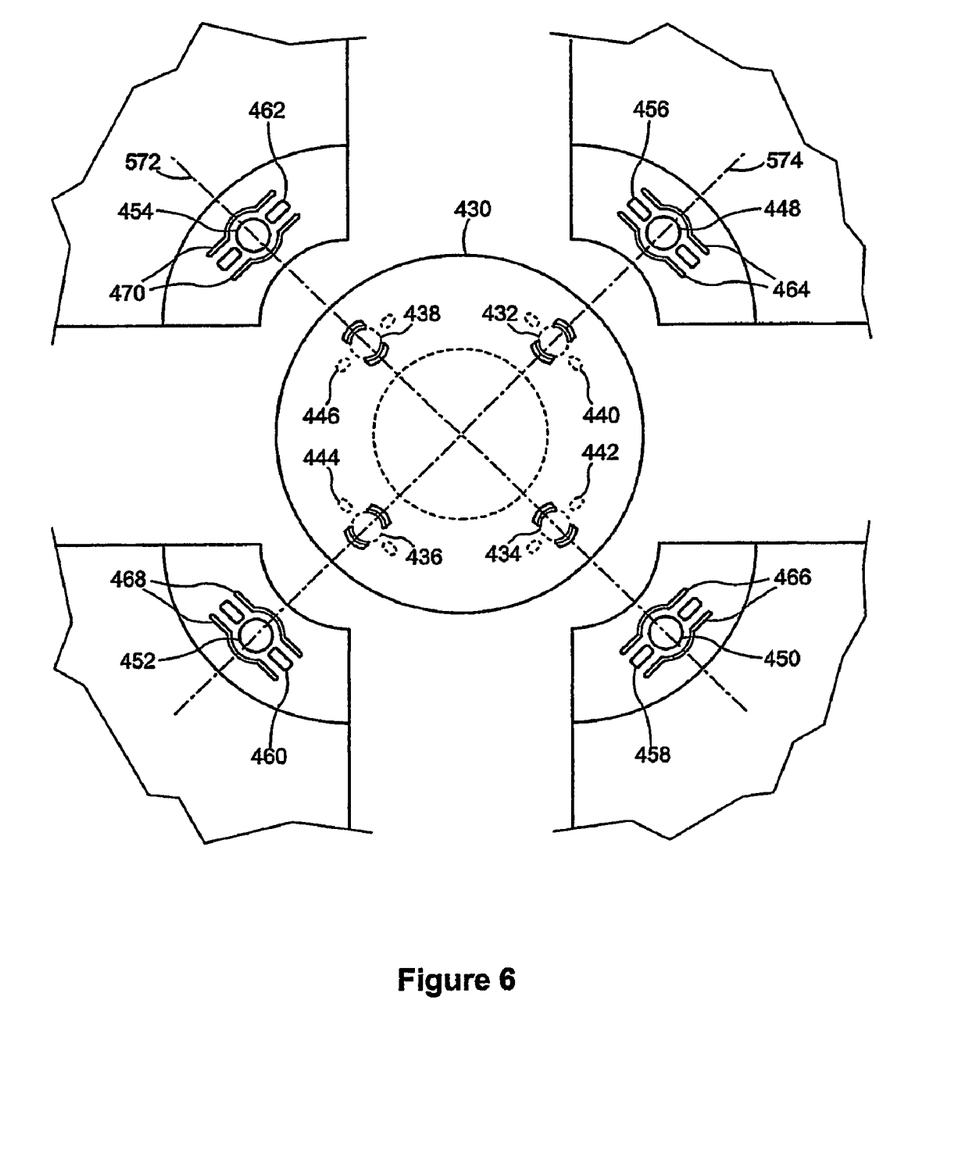
FIG. 6 is a plan view of an attachment piece and surrounding anchor sheets with complementary first and second halves of a flexible detachable attachment.

The prong 33 and rim 47 and 48 may be made from the same material as the anchor sheet or the attachment piece, as long as the material is sufficiently flexible. It is preferred that the material be polypropylene or polyethylene. For example, polypropylene such as that sold as STAMYLAN™ P112MN40 with an ISO of 1873 indication of PP-H,MA-M400 is acceptable. This material has a melt-flow index of 50 (T-230 degrees C., F=2.16 kg) a tensile modulus of 1900 MPa, proportional strength of 35 MPa, ultimate strain of greater than 50%, a density of 910 kg/m$^2$, and a melting point of approximately 160 degrees Celsius. The attachment device 31 may include two registering pins 35 and two corresponding indentations 41 for receiving pins 35. Pins 35 and indentations 41 co-operate to align the attachment piece 31 with the anchor sheet 1. This arrangement can encourage atmospheric expansion and contraction to occur, in a direction along a line 572 or 574 that passes approximately through the middle of expansion openings, as shown in FIG. 6. In FIG. 6, attachment piece 430 has male members 432, 434, 436, and 438 on the bottom surface of its upper-disk, with corresponding registering pins 440, 442, 444, and 446. These fit into corresponding openings 448, 450, 452, and 454 and corresponding pin receptacles 456, 458, 460 and 462. After the prongs and registering pins are inserted into the corresponding round opening and pin receptacles, atmospheric expansion and contraction will be encouraged to take place generally through the centres of the horseshoe openings 464, 466, 468 and 470, along lines 574 and 572. It is not necessary to restrict the expansion and contraction to these lines, but it is thought in practice that this is the natural way that the sheets will expand and contract.

Referring to FIG. 3, while in the above description, the first half of the attachment device has been described as being an attachment piece 31, and the second half has been described as being on an anchor sheet 1, there could be a reversal of the male and female members, however because the male member projects down into the resilient layer 5, it is preferable to have the male member on the attachment piece which is projecting into the resilient layer.

Figure 7:
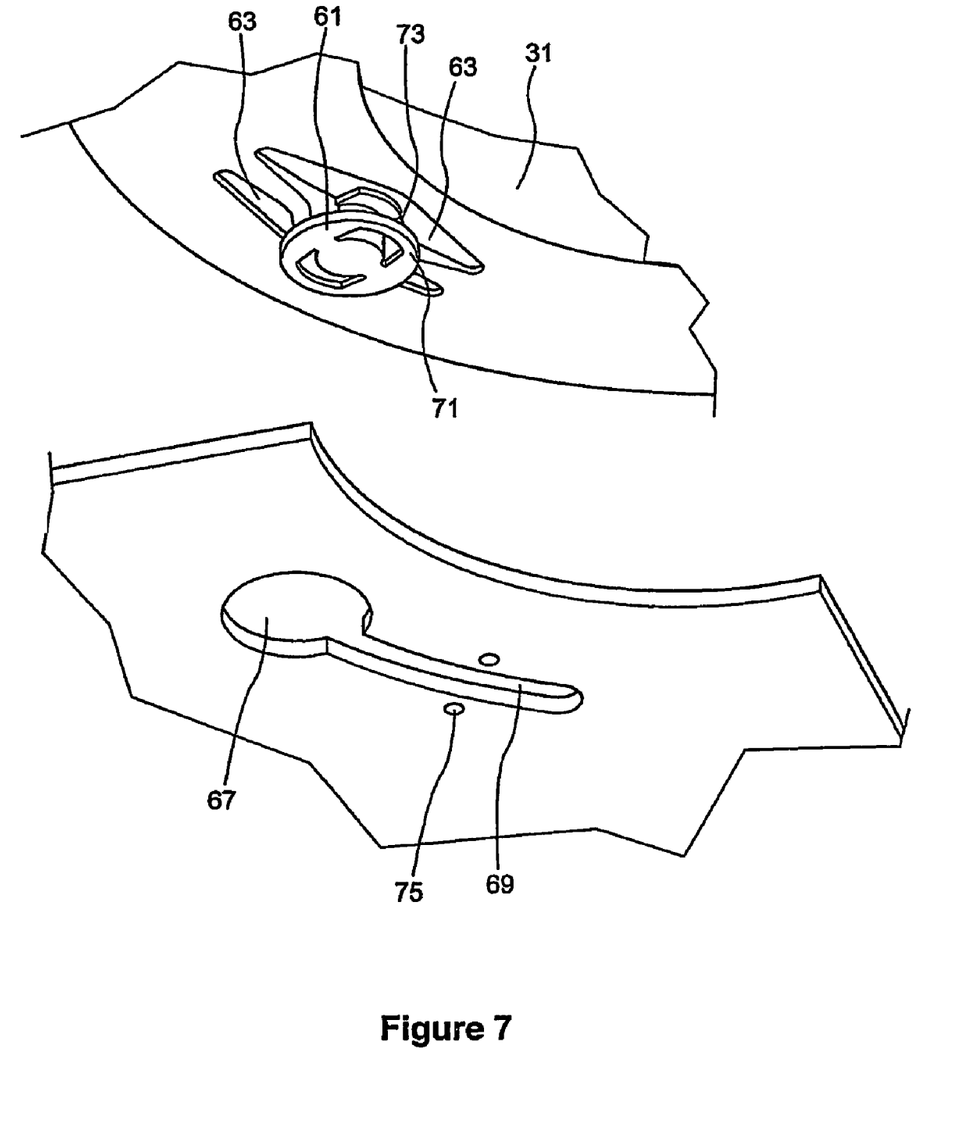
FIG. 7 is an alternative embodiment for a first and second anchor sheet showing a male member with areas of flexibility.
Figure 8:
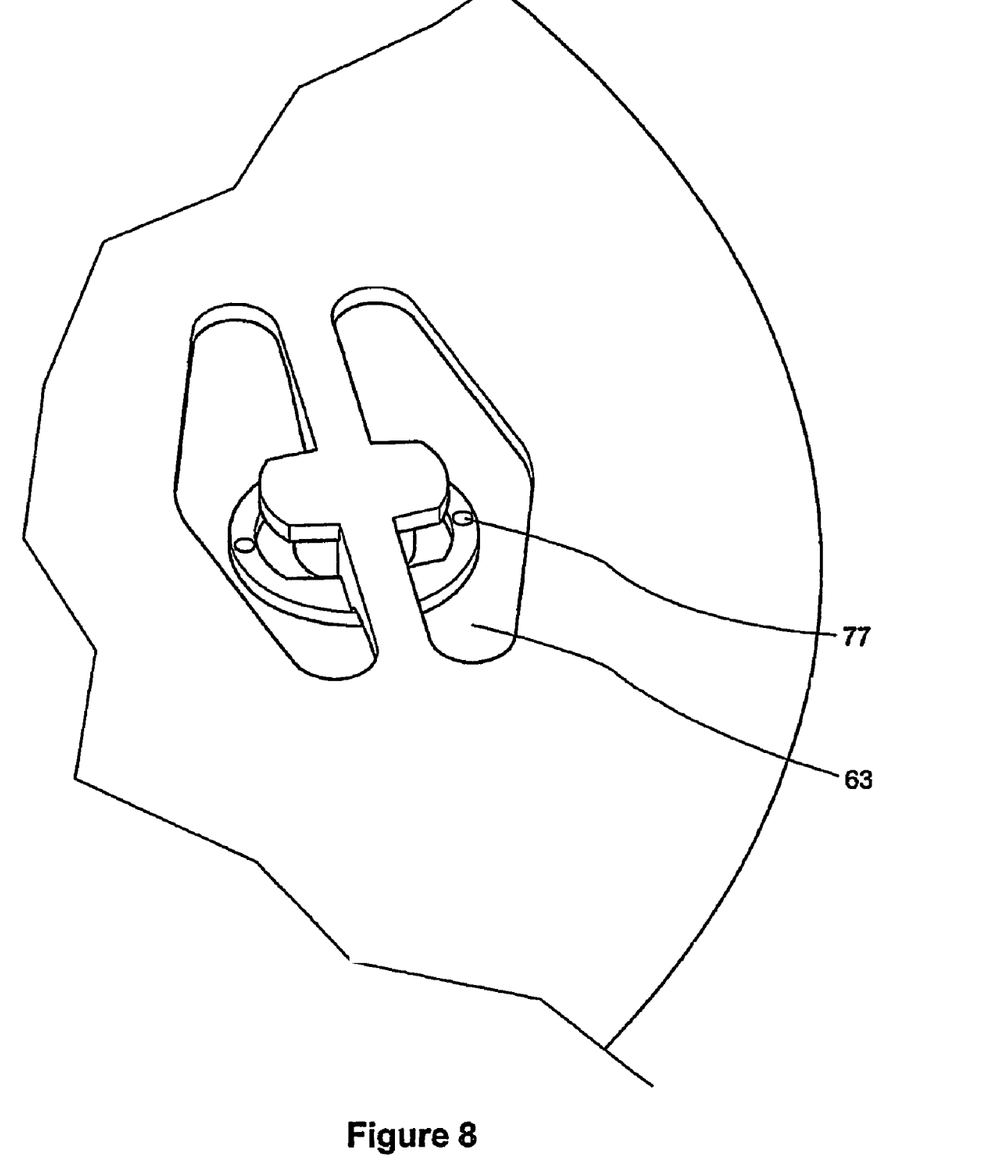
FIG. 8 is a detail of the male member of FIG. 7.
Figure 9:
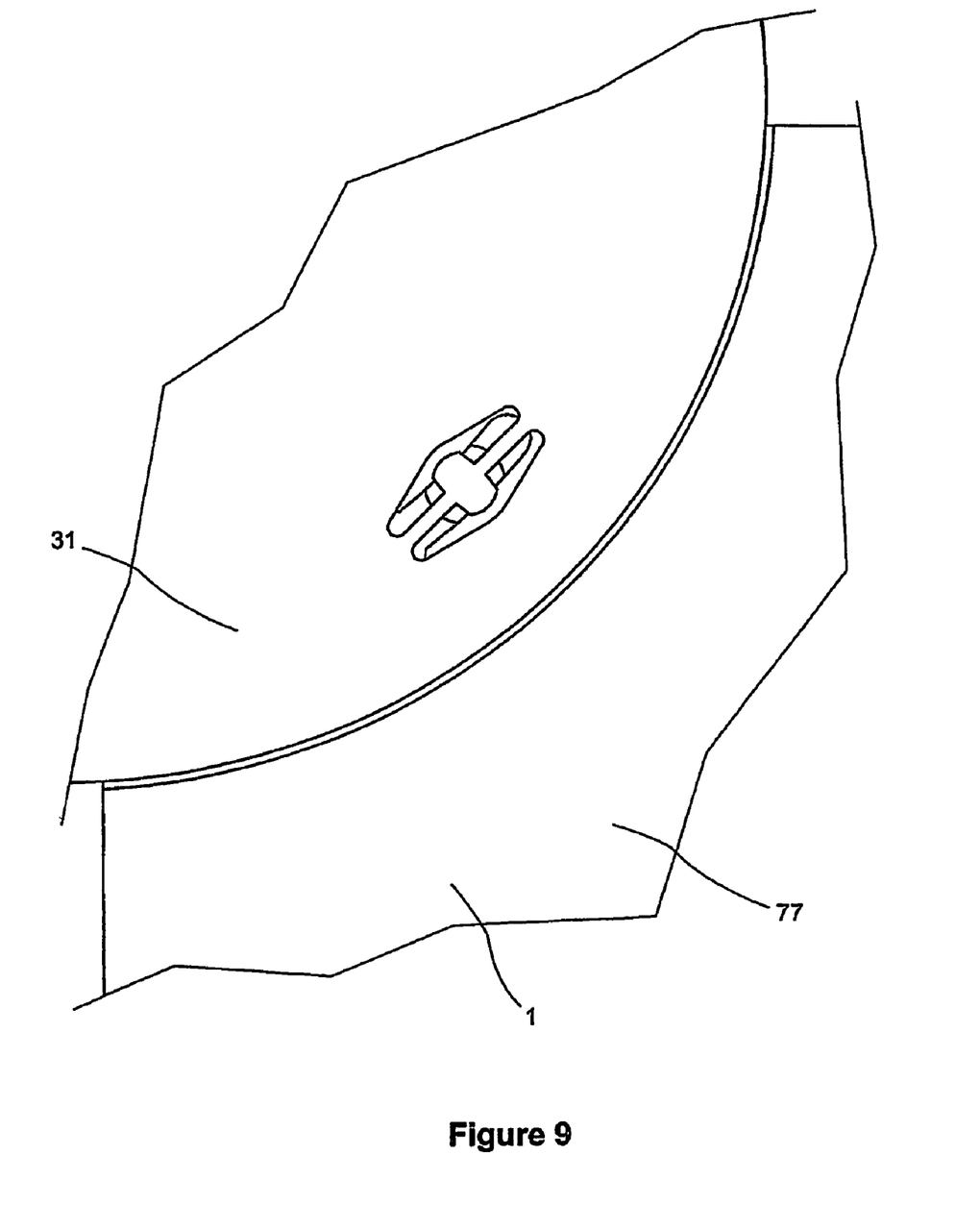
FIG. 9 is a detail of the male and female member of FIG. 7 united on a sheet, in plan view from above.

As shown in FIG. 7, male member 61 can also be provided with expansion openings 63 and 65, which will allow for the male member to move on the attachment device 31. In this embodiment, male member 61 is inserted into keyhole 67, and then twisted to move into channel 69. The flange or cam surface 71 on male member 61, prevents the upward movement of attachment piece 31 once it has been moved into channel 69. In addition, there are also registration pins 73 on the underside of head 61, which can register with small indentations 75 to locate the attachment device 33 in relation to the anchor sheet 1. As shown in FIG. 8, registration pins can also be registration receptacles 77, so co-operate with pins at locations 75 on anchor sheet 1. FIG. 8 also shows the expansion opening 63 in greater detail. FIG. 9 shows the attachment device 31 and the anchor sheet 1 shown in plan view from above. Because of the countersink, attachment device 31 and anchor sheet 1 are on the same plane, presenting a flat surface. Not completely shown, but to be understood, is that typically the anchor sheet will be covered in hooks (not shown), as will the attachment device 31.

It is noted that those skilled in the art will appreciate the modifications of detail may be made from the embodiments described herein which would come within the spirit and the scope of the invention as described in the following claims.

The invention claimed is:

1. A first sheet member to connect to an overlapped second sheet member to form a substantially horizontal surface comprising the following:
   (a) the first sheet member being a regular geometric shape and having at least one edge, a first surface, and a generally arcuate countersunk surface below the level of the first surface and at the edge of the geometric shape;
   (b) the first sheet member having in the countersunk portion a first aperture, for receiving a second male member of the overlapped second sheet;
   (c) the first sheet provided on two opposite sides of the first aperture with second and third apertures proximate to the first aperture, so as to create areas in the sheet of increased flexibility about of the first aperture adjacent the second and third apertures to permit movement of the first sheet member relative to the second sheet member when the second male member is located within the first aperture.

2. The first sheet member of claim 1 in which the first aperture is circular.

3. The first sheet member of claim 2 in which are contained means to aid in registering the first member circumferentially in relation to the overlapped second male member.

4. The sheet member of claim 1 having its first surface substantially covered in hooks, being one-half of a hook and loop attachment system.

5. The sheet member of claim 4 in which the sheet is made of a relatively thin plastic between 0.020 inches and 0.75 inches.

6. The sheet member of claim 5 in which the plastic is polypropylene or polyethylene.

7. The sheet member of claim 6 which has a resilient layer attached to a second opposite surface.

8. A sheet surface area comprising:
   a first sheet member being a regular geometric shape and having at least one edge, a first surface, and a generally arcuate countersunk portion below the level of the first surface and at the edge of the geometric shape, the first sheet having, in the countersunk portion, a first aperture having a first size and a channel of a smaller size than the first aperture and connecting to the first aperture; and
   a second sheet member with at least an overlapping portion of a thickness matching the thickness of the countersink of the first sheet member and having a male member with a stem and a head, the head having a second size corresponding to but smaller than the first aperture and larger than the size of the channel, and in which the stem has a thickness corresponding to the size of the channel of the first sheet member so that the head of the second sheet member can be inserted into the first sheet member through the first aperture and a shaft moved into the channel to prevent upward motion of the head and of the first sheet member in relation to the second sheet member, and in which the second sheet member contains first areas of expansion and flexibility on opposite sides of the male member, so as to provide for flexible planar movement of the second sheet member in relation to the first sheet member when the shaft is located within the channel.

9. The sheet surface area of claim 8, wherein the areas of expansion are first expansion apertures.

10. The sheet surface area of claim 9, wherein the first sheet member contains second areas of expansion and flexibility on opposite sides of the first aperture and the channel.

11. The sheet surface area of claim 10, wherein the second areas of expansion are second expansion apertures.

12. The sheet surface area of claim 10, wherein the first surface is substantially covered in hooks of a hook and loop attachment system.

13. The sheet surface area of claim 12, wherein the first sheet member comprises a plastic and is of a thickness between 0.020 inches and 0.75 inches.

14. The sheet surface area of claim 13, wherein the plastic is selected from the group consisting of polypropylene and polyethylene.

15. The sheet surface area of claim 14, wherein the first sheet has a resilient layer attached to a second opposite surface.

16. The sheet surface area of claim 15, wherein the first aperture is circular.

17. The sheet surface area of claim 16, wherein the head of the male member is circular.

18. A sheet surface area of at least two overlapped sheets, comprising:
   i) a first anchor sheet being a regular geometric shape and having at least one edge, a substantially horizontal surface, and a generally arcuate countersunk portion from the horizontal surface located at the edge of the geometric shape;
   ii) a female aperture within the countersunk portion; and
   iii) a second anchor sheet having at least an overlap portion of a thickness to fit into the countersunk portion of the first anchor sheet to present a substantially planar surface, the second sheet having a male member having, in combination with the female aperture, means to be inserted and retained in the female aperture, in which at least one of the male member or the female aperture have expansion openings or areas of flexibility on at least one of the first or second sheets proximate to at least one of the male member or the female aperture to provide for movement of at least one of the male member or the female aperture, about a plane between the expansion areas when the male member is located within the female aperture.

* * * * *